(12) United States Patent
Yovichin et al.

(10) Patent No.: US 7,896,993 B2
(45) Date of Patent: Mar. 1, 2011

(54) METHOD AND APPARATUS FOR BUILDING AND TRANSFERRING A TREAD BELT STRUCTURE

(75) Inventors: Albert James Yovichin, Doylestown, OH (US); Robert Albert Lammlein, Jr., Cuyahoga Falls, OH (US); Thomas John Rood, Clinton, IL (US); George Michael Stoila, Tallmadge, OH (US); James Alfred Benzing, II, North Canton, OH (US); Thomas Eugene Brown, Uniontown, OH (US); Ronald Paul Homolak, Brunswick, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 679 days.

(21) Appl. No.: 11/944,890

(22) Filed: Nov. 26, 2007

(65) Prior Publication Data

US 2008/0110547 A1    May 15, 2008

Related U.S. Application Data

(62) Division of application No. 10/658,501, filed on Sep. 9, 2003, now abandoned.

(51) Int. Cl.
*B29D 30/70* (2006.01)
*B29D 30/26* (2006.01)

(52) U.S. Cl. ............... 156/64; 156/111; 156/123; 156/127; 156/396; 156/406.2

(58) Field of Classification Search ............... 156/126, 156/127, 128.1, 128.6, 129, 130, 406.2, 396, 156/111, 123, 124, 64
See application file for complete search history.

(56) References Cited

U.S. PATENT DOCUMENTS 4,304,619 A * 12/1981 Riggs .................. 156/126
5,061,339 A * 10/1991 Nakagaki ............. 156/446

* cited by examiner

*Primary Examiner*—Geoffrey L Knable
(74) *Attorney, Agent, or Firm*—June E. Rickey

(57) ABSTRACT

The method of building and transferring a tread belt structure on a portable and collapsible building drum 10 mounted coaxially on a building machine 100 with a rotatable shaft 120 is disclosed. The method includes the steps of forming the annular tread belt 4 on the building drum 10, transferring the building drum 10 with the tread belt 4 from the rotatable shaft 120 onto a pivoting transfer device 200, pivoting the transfer device 200 about 90° rendering the tread belt 4 and axis of the building drum 10 perpendicular to a horizontal plane, collapsing the building drum 10, separating the annular tread belt 4 from the building drum 10, removing the tread belt 4, expanding the tire building drum 10, pivoting the building drum 10 into coaxial alignment with the rotatable shaft 120, moving the building drum 10 onto the shaft 120. The tread belt 4 has one or more elastomeric components applied while hot and the equipment provides means for weighing the tread belt 4.

6 Claims, 17 Drawing Sheets phasized # METHOD AND APPARATUS FOR BUILDING AND TRANSFERRING A TREAD BELT STRUCTURE This Divisional Patent Application claims priority from U.S. patent application Ser. No. 10/658,501, filed Sep. 9, 2003, now abandoned.

FIELD OF THE INVENTION

The invention relates to a method and apparatus for building and transferring a large tread belt reinforcing structure on a building drum to a tread belt curing mold.

BACKGROUND OF THE INVENTION

The manufacture of annular tread belts for later assembly to an unvulcanized tire carcass is known.

One method described in U.S. Pat. No. 3,865,670 taught the use of an expansible and contractible transfer ring for conveying a breaker tread assembly from a building drum in a tire building machine to a tire carcass mounted on a tire shaping machine.

An improved but somewhat similar U.S. Pat. No. 3,888,720 also disclosed a separate tread breaker building drum designed to vary in size to accommodate different sizes of tires.

Similarly, the Charles E. Todd U.S. Pat. No. 3,865,669 also disclosed an expansible and contractible transfer ring for conveying a breaker-tread assembly.

Each of these prior art patents recognized that an assembly of a tread belt to a tire carcass can be accomplished off-line or separate from the carcass building machine. Once formed into a ring these tread breaker assemblies could be moved to encircle a tire carcass, the carcass inflated to contact the inner surface of the tread breaker assembly and then stitched together by a roller mechanism to form a green or uncured tire assembly to be placed into a mold.

While these assembly techniques provided efficiencies in production, none really changed the method for actually forming a tire assembly.

Conventional tire molds, whether two piece molds or segmented molds, form the tread surfaces by pressing groove forming ribs and sipe forming blades into the tread rubber as the tire is molded. As this is done the belt cords, particularly those directly under the groove-forming ribs deflect in small but noticeable undulations. These undulations create a variety of changes across the tread that actually can vary the surface or change the amount of tread rubber across the otherwise normal appearing tire. These non-uniformities can lead to mass imbalance issues, irregular wear and a variety of associated ride and handling performance issues. The goal in tire manufacturing is to minimize unpredictable non-uniformities in manufacturing while also building the tire in a very cost-efficient manner.

In the manufacture of very large tires the curing cycle my take many hours. A faster way to build such large tires is to form the tread belt assembly and the carcass assembly separately and to separately vulcanize these assemblies to create a two piece tire system. The separate curing of the tread belt structure and the carcass structure can save several hours of curing tires. Furthermore, the carcass assembly can survive several tread belt lives so the end product is much more efficient in its use. Four to five tread belts can used on a single carcass. This means the manufacturer must build several times more tread belts than carcass assemblies. A typical two piece tire assembly is described in Rayman U.S. Pat. No. 6,561,241 issued May 13, 2003.

In U.S. Pat. No. 6,526,659, a method of changing very large tires is disclosed. In that patent it is noted that tread belt pneumatic tires which are subject to the method of the present invention are very large tires (greater than 119.9 inches outside diameter (OD)) generally designed for use on very large vehicles, generally off-the-road vehicles such as earthmovers and large capacity mining trucks (e.g., 300 short tons or more). The size of these tires is extremely large. For an example, the tire weight can be approximately 8,000 pounds (3,628 kg) to 15,000 pounds (6,803 kg) or more for an unmounted tire. When using a two-piece type tire wherein the tread belt forms the outer structure and the inner structure is formed by a carcass wherein the two parts are separable, the tread belt alone will weigh over 4,000 pounds typically, many times more depending on the size. By way of example, a 57 inch nominal rim diameter two-piece tire having a 45R57 size will have a tread belt assembly having an outside diameter of approximately 12 foot or roughly 144 inches and will weigh approximately a little more than 4,500 pounds, a smaller but still very large 51 inch nominal rim diameter tire of a 3300R51 size yields a 3000 lb. tread belt, and the massive 63 inch 59R63 tire has a tread belt weighing in at 8424 lbs.

Slight variations in the manufacturing process can be very costly. A one-percent variation in material can cause a 30 to 85 pound weight change. In the manufacture of small tires a two percent variation is quite common.

It is an object of the present invention to provide a tread belt assembly method that very precisely applies the components and can control the application to minimize weight variations.

It is a further object of the invention to provide a portable collapsible building drum apparatus that can be easily and quickly moved from a building station to a transfer station and back.

SUMMARY OF THE INVENTION

The method of building and transferring a tread belt structure on a portable and collapsible building drum mounted coaxially on a building machine with a rotatable shaft is disclosed. The method includes the steps of forming the annular tread belt on the building drum, transferring the building drum with the tread belt from the rotatable shaft onto a pivoting transfer device, pivoting the transfer device about 90° rendering the tread belt and building drum's axis perpendicular to a horizontal plane, collapsing the building drum, separating the annular tread belt from the building drum, removing the tread belt, expanding the tire building drum, pivoting the building drum into coaxial alignment with the rotatable shaft, moving the building drum onto the shaft.

The step of forming the annular tread belt further may include the steps of applying at least one first tread rubber layer or a plurality of first tread rubber strips onto the rotating building drum, then applying one or more cord reinforced layers over the at least one first tread rubber layer or plurality of strips while rotating the building drum, and winding one or more layers, preferably many layers, of tread rubber onto the underlying cord and rubber layers to form the tread belt structure. While the steps of forming the tread belt are being accomplished, the steps of weighing the building drum as the tread belt is being formed annularly is accomplished through the use of sensors, preferably strain gauges, attached to the rotating shafts supporting the building drum. The step of weighing the material as it is being applied enables the steps of adjusting the amount of elastomeric material to be applied to form the tread belt to match the weight to a predetermined specification weight.

Alternatively, the weight of the tread belt can be established using deflection sensors to measure the movement of the cantilevered shaft.

The weighing of the tread belt is further confirmed by the use of load cells 121 at the transfer means 200 or, alternatively, at the building machine 100.

Preferably, the steps of forming the elastomeric layers are accomplished by calendering or extruding strips or sheets of unvulcanized rubber at the tread belt building machine. The steps of controlling the weight of the elastomeric material is accomplished by adjusting the gauge of the material as a function of the monitored weight of the building drum or by increasing the number of windings of the unvulcanized rubber by an increased rotation of the building drum.

The above method is best accomplished by an apparatus for building and transferring a tread belt reinforcing assembly which has a drive means for rotating a building drum, the drive means including a drum supporting shaft, a building drum for applying the elastomeric components and a weight sensor connected to the drum supporting shaft for measuring and monitoring the amount of rubber applied to the building drum, or the deflection sensor or load cells used to perform the weight sensing.

Weight measuring is best accomplished by a computer controlled means for adjusting the amount of material being applied to the building drum. The computer controlled means analyzes the weight sensor data to direct increases or decreases in material being applied. The apparatus further includes at least one means for strips of elastomeric material to be applied to the building drum, the at least one means also being controlled by the computer control means, preferably at least the means for supplying the layers of tread rubber is controlled to adjust the tread belt weight.

The preferred apparatus has a radially collapsible tread belt building drum slidably mounted on the building drum shaft and a transfer means for removing the building drum. The transfer means includes a tread belt transfer shaft attached to a pivotably movable frame and wherein the transfer shaft is pivoted into coaxial alignment with the building drum supporting shaft for building drum transfer and is pivoted upright for tread belt removal. The apparatus preferably further includes a means for moving the tread belt from the building drum shaft onto the transfer shaft. Preferably the entire building drum is slidably movable on the shaft and is moved directly onto the coaxially aligned transfer shaft. The removable building drum preferably is collapsible and has a tread belt building surface. The tread belt building surface is formed by a plurality of arcuate segment assemblies. Each segment assembly is radially contractible. Each segment is connected to a pair of hydraulic or air cylinders internally positioned between the arcuate segment and a central hub. Each segment assembly includes a trapezoidal support and an arcuate building surface. Each trapezoidal support has the radially inner portion narrow and the sides of all the adjacent trapezoids are contacting to form a 360° rigid frame when in either the fully extended or retracted position. The building surface arcuate segments are alternating arcuate segments having the inner portion narrow and the outer portion wider and the inner portion wider and the outer portion narrower in each adjacent pair creating an alternating pattern that permits the outer surface to form a complete peripheral surface for building the tread belt assembly in a fully supported manner and which permits each segment to be retracted in an alternating position for tread belt removal. For example, assuming there are eight quadrants, four will have the outer portion wider and inner portion narrower and four will have the outer portion narrower and inner portion wider so that the segments may be retracted in a sequence and expanded in a sequence to form the building surface and to permit a contraction so the tread belt can be released in a convenient and efficient manner.

DEFINITIONS

"Bead" means that part of the tire comprising an annular tensile member wrapped by the ply cords and shaped, with or without other reinforcement elements such as flippers, chippers, apexes, toe guards and chafers, to fit the design rim.

"Belt or breaker reinforcing structure" means at least two layers of plies of parallel cords, woven or unwoven, underlying the tread, unanchored to the bead, and having both left and right cord angles in the range from 17° to 75° with respect to the equatorial plane of the tire.

"Bias ply tire" means a tire having a carcass with reinforcing cords in the carcass ply extending diagonally across the tire from bead core to bead core at about 25°-50° angle with respect to the equatorial plane of the tire. Cords run at opposite angles in alternate layers.

"Carcass" means a radial or bias tire structure absent the tread and belt structure.

"Casing" means a radial or underlying tire structure absent the tread.

"Circumferential" means lines or directions extending along the perimeter of the surface of the annular tread perpendicular to the axial direction.

"Cord" means one of the reinforcement strands of which the plies in the tire are comprised.

"Equatorial plane (EP)" means the plane perpendicular to the tire's axis of rotation and passing through the center of its tread.

"Footprint" means the contact patch or area of contact of the tire tread with a flat surface under load and pressure.

"Lateral" and "laterally" mean lines or directions that are parallel to the axis of rotation of the tire (also "axial").

"Normal inflation pressure" refers to the specific design inflation pressure at a specific load assigned by the appropriate standards organization for the service condition for the tire.

"Normal load" refers to the specific load at a specific design inflation pressure assigned by the appropriate standards organization for the service condition for the tire.

"Ply" means a continuous layer of rubber-coated parallel cords.

"Radial" and "radially" mean directions extending radially toward or away from the axis of rotation of the tire.

"Radial-ply tire" means a pneumatic tire in which the ply cords, which extend from bead to bead are laid at cord angles between 65° and 90° with respect to the equatorial plane of the tire.

"Zero-degree wires" means at least one layer of parallel cords (usually metal wire), underlying the tread, unanchored to the bead, spiraling circumferentially around the tread, and having cord angles in the range from 0 degrees to 5 degrees with respect to the equatorial plane of the tire.

BRIEF DESCRIPTION OF THE DRAWINGS

Reference will be made in detail to the preferred embodiments of the invention, examples of which are illustrated in the accompanying drawing figures. The figures are intended to be illustrative and not limiting. Although the invention is generally described in the context of these preferred embodiments, it should be understood that it is not intended to limit the spirit and scope of the invention to these particular illustrated embodiments.

Certain elements in selected views of the drawings may be illustrated for clarity. Cross-sectional views, if any presented herein, may be in the form of slices or near-sided cross-sectional views omitting certain background lines which would otherwise be visible in a true cross-sectional view, for illustrative clarity.

DETAILED DESCRIPTION OF THE INVENTION

Figure 1:
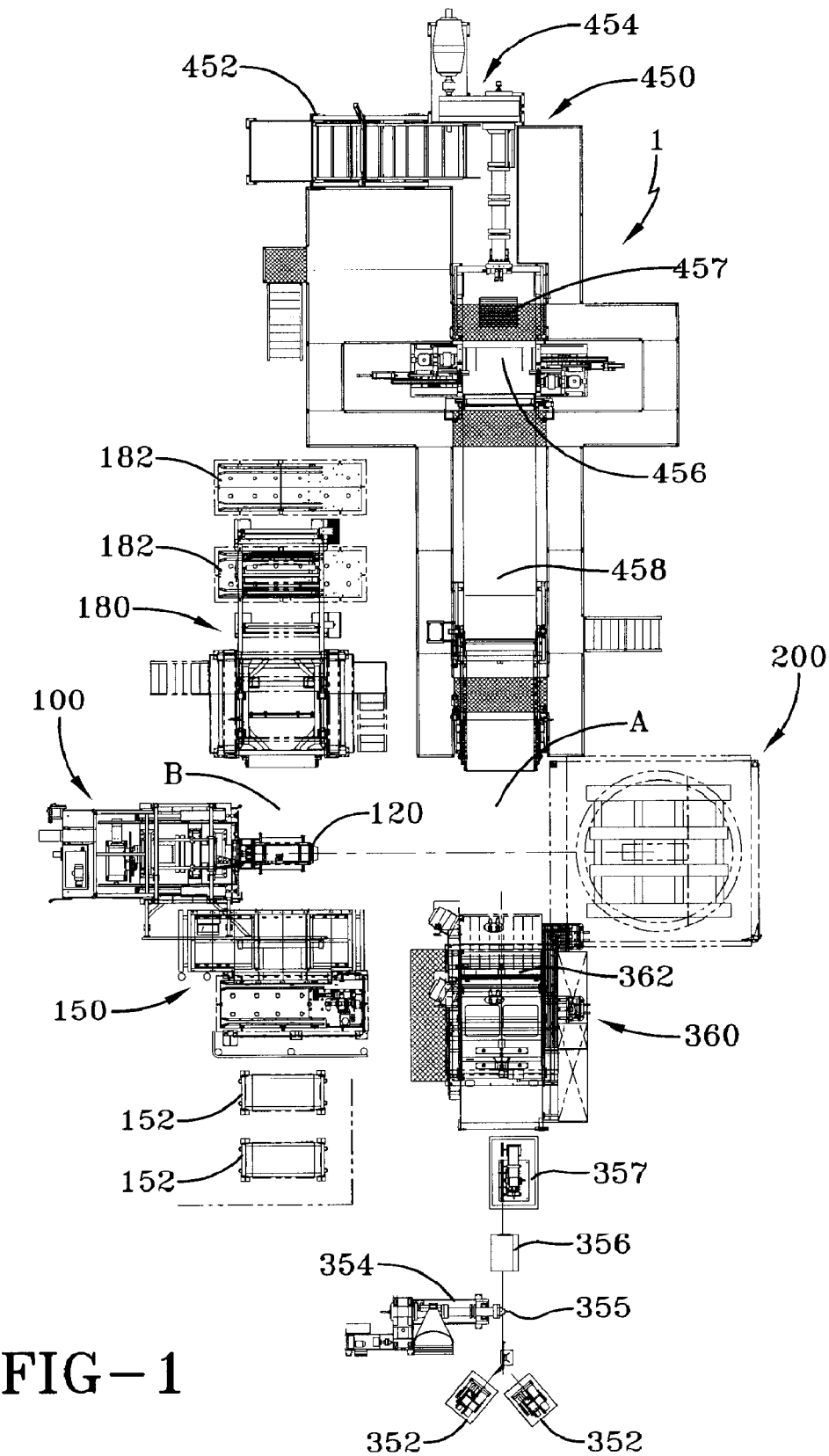
FIG. 1 is a top view of the overall tread belt assembly system according to the present invention.
Figure 2A:
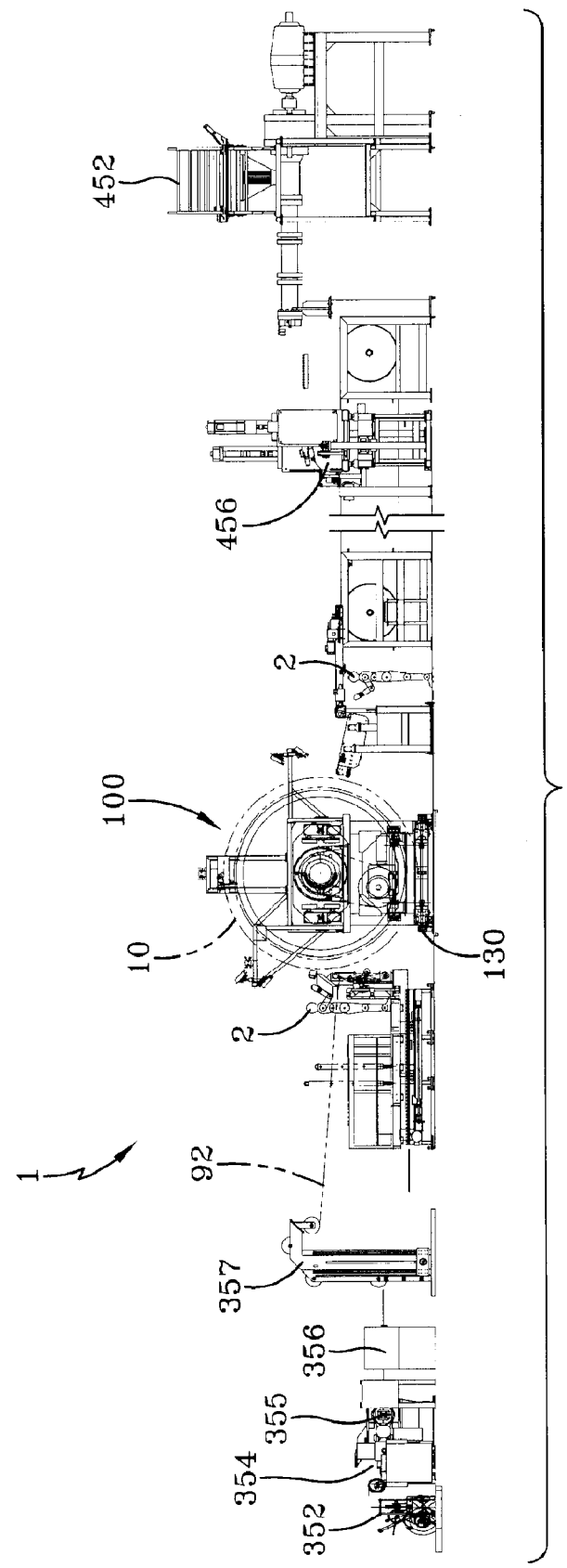
FIG. 2A is a side view of the overall tread belt assembly system shown in FIG. 1.
Figure 2B:
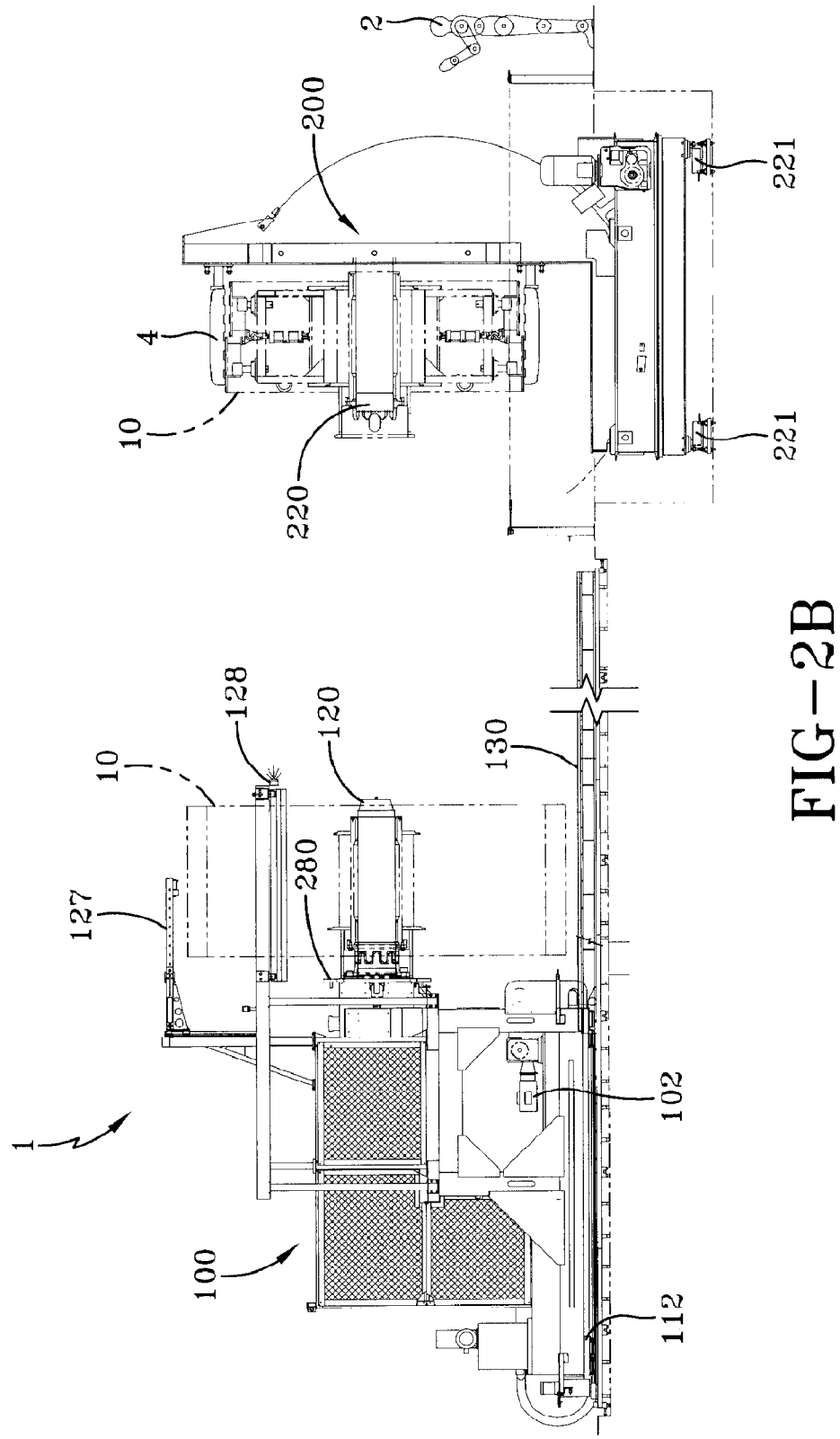
FIG. 2B is a plan view of the building drum and transfer apparatus taken from FIG. 1.

A method and apparatus for forming a tread belt is disclosed. With reference to FIGS. 1, 2A and 2B, a system for forming a tread belt assembly for a large two piece tire assembly is shown. The system 1 as illustrated in FIG. 2B has a tread building drum 10 attached to a means 100 for building the tread belt assembly and a transfer means 200 for accepting the tread belt assembly 4 and the building drum 10.

FIG. 2A shows a portion of system 1 from an elevation or side view. The means 100 for building the tread belt 4 is positioned about midway between the various mechanisms for forming the components that make the tread belt assembly 4

As shown in FIG. 1, an overhead view of the system 1 is illustrated. The means 100 has various mechanisms on each side of the building shaft 120. As shown, the building drum 10 and the rail mechanism 130 which permits the means 100 to move between a first position A and a second position B are not illustrated. As shown in FIG. 1, the means 100 is located in position B.

Figure 14:
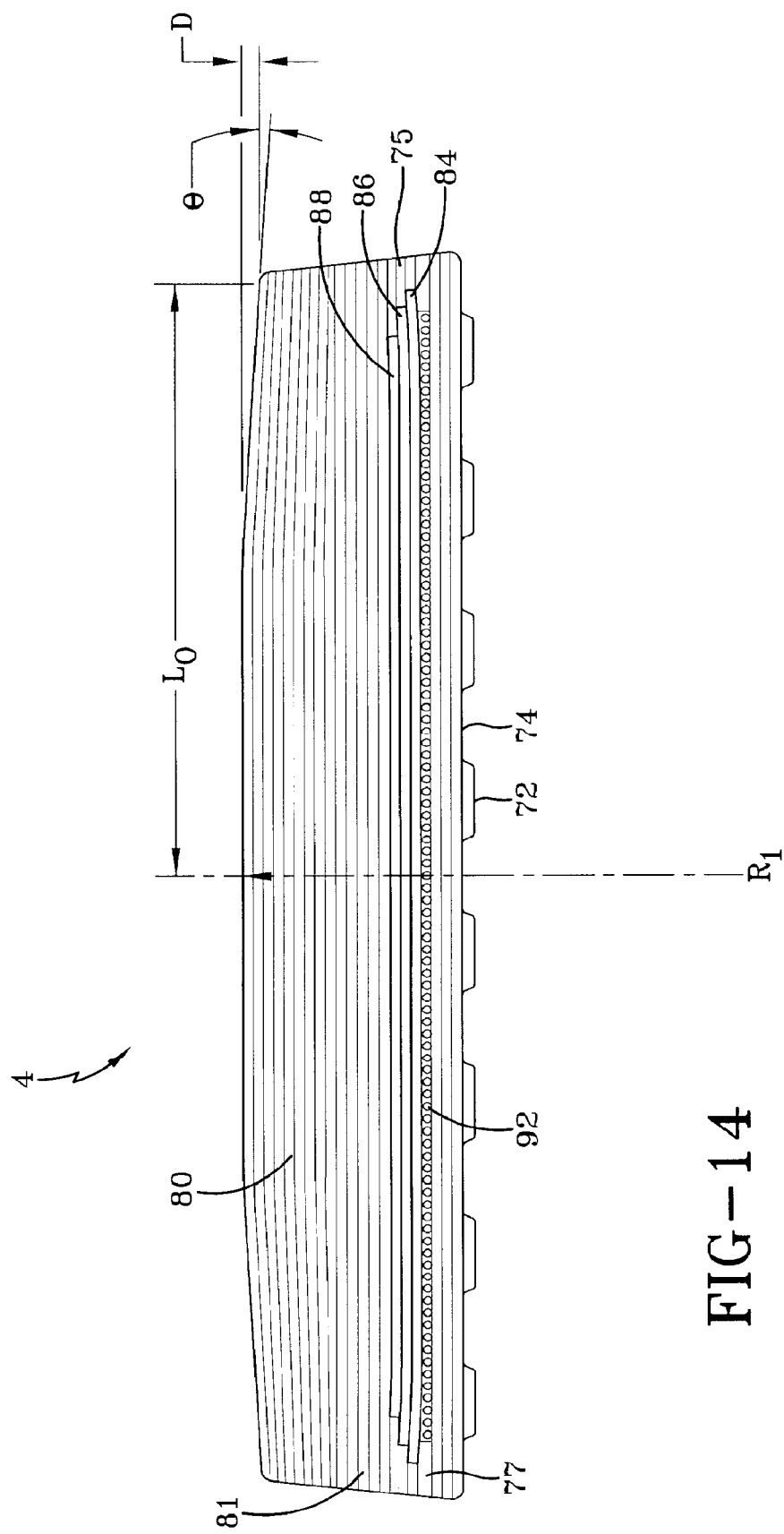
FIG. 14 is a cross-sectional view of the tread belt assembly.

As shown in FIG. 14 the formed tread belt assembly 4 is comprised of various components which are described in U.S. Pat. No. 6,561,211 which is incorporated by reference in its entirety. The tire tread belt 4 includes a tread portion 80 and a plurality of tread belts 84, 86 and 88. A radially inner belt layer 84 and 86 have cords of steel having a core strand surrounded by a sheath of strands. The core strand preferably has a plurality of three filaments forming the core. The wire construction is as described in copending application Ser. No. 09/507,316, filed Feb. 18, 2000, entitled "Steel Cord for Reinforcing Elastomeric Articles" which is incorporated by reference in its entirety. Each tread belt layer 84, 86 has the cords oriented at an angle of 15° to 80° relative to the circumferential direction and the cords are preferably spaced at 4 ends per inch. These adjacent layers 84, 86 are equal but oppositely oriented. The radially outermost third layer 88 has steel cords oriented at 90° relative to the circumferential direction. This, in combination with the belt layers 84, 86 creates a very strong construction. Radially inward of these belt reinforcement layers is a unique first reinforcement layer 90 having cords 92 oriented 0° or approximately 0° relative to the circumferential direction and preferably spaced at three ends per inch.

While tread belts 84 through 88 are illustrated, it is within the scope of the invention to use any other number of tread belts layers as needed. The unique aspect of the tread belt is the use of 0° wire cord 92 in the first reinforcement layer 90. The 0° wires in layer 90 encircle the tire tread belt and are provided to restrict the radial growth of the tread belt due to serious deflection in the tire carcass. By keeping the tread belt from radially expanding outwardly the tire's tread will maintain a more flat tread profile which will improve tread life and durability. The 0° wires in the first reinforcement layer eliminate the need for a larger number of belt layers. Radially inward of the 0° wires 92 along the under side or inner circumference of the tread belt is a plurality of strips 72 and grooves 74. The strips 72 form ribs on the inner surface of the tread belt assembly when the tire is molded. Each strip 72 is spaced a distance sufficient to form a groove 74. These grooves and ribs interconnect with the mating tire casing when assembled. The tread belt 4 as illustrated in FIG. 14 is best assembled using the method described below employing the system 1 as illustrated in FIG. 1.

The first step in the assembly of the tread belt 4 has the means 100 for forming the tread belt located at position A at which point strips 72 are placed in the grooves on the building drum 10. This initial layup of strips 72 filling the grooves on the building drum 10 form the first or inner surface layer. The means 100 is then moved back to position B wherein an inner cover layer is applied from the gum server means 180 having a pair of A frame trucks 182 loaded with gum layers material. The inner cover layer 74 may be three or four windings on the building drum and form additional elastomeric inner surface for the tread belt 4. The means 100 is then moved to position A wherein a mechanism feeds rubber encapsulated wires 92 spirally or helically wound at an angle close to 0° at least one full wrap around the circumference of the tread drum 10. On each lateral side of the helically wound wires 92, gum wedges 75, 77 are applied to the edges of the tread belt forming a complete second layer.

As shown in FIG. 1 the 0° wires 92 is fed from one or more wire let-off mechanisms 352 in synchronization with the rotating building drum. An extruder 354 feeds encapsulating rubber through a die 355. A cable puller 356 pulls the strands to the safety festoon 357 which feeds the rubber coated wires 92 through the means 360 for applying the wires 92 to the building drum 10. The means 360 includes a level wind head 362 to insure the cords 92 are spirally wound precisely located on the building drum 10. The coated wires 92 are applied while the rubber is still warm insuring a much-improved adhesion.

The method of encapsulating the wires 92 at the building system 1 permits the coated wires 92 to be placed on the building drum 10 while the uncured rubber is hot. The rubber naturally adheres better and provides the compound to be made without using costly tackifiers and anti-blooming agents. As shown, the encapsulated wires 92 are fed through the die 355 in pairs of two cables. This insures the rubber-coated wires have a rectangular shape making the wires easy to spirally wind onto the drum 10. The wires 92 can optionally be wound using two separate feed lines starting from the lateral edges of the building drum 10 and moving to the center of the building drum 10 effectively cutting revolutions of the drum 10 in half. Optionally the die 355 may include more wires 92 to form a strip of three or more encapsulated wires.

The means 100 is then moved back to position B wherein belt layers are applied to the building drum, belt layer 84 being in a left hand direction having the cords oriented on a slight bias angle as previously noted and a second layer is wrapped around the cords in an opposite but equally oriented direction forming belt layer 86. Along the lateral edges additional gum wedges or filler strips 75, 77 are wrapped around the belt layers 84, 86 to complete the assembly of the third and fourth layers. Additionally, one wrap of 90° cord is placed around the tread belt assembly and filler strips 75, 77 are added to the edges form the belt layer 88.

The means 150 for applying the breaker or belt layers 84, 86, 88 are shown just below the means 100 in FIG. 1. A pair of A frame trucks 152 for supplying the belt layers are adjacent the means 150. The operator applies each belt layer 84, 86, and 88 and forms a spliced but joint parallel to the direction of the cords in each respective layer.

The means 100 is then moved forward into the position A wherein a hot former calender assembly 450 shown on the right hand side of the figure feeds layers of tread rubber to the drum 10 as it is rotated. The layers 81 of tread rubber 80 are approximately 0.08 inches thick at the center and are wrapped about the tread belt assembly 4 for about a total thickness of four inches. Each layer 81 has a profiled center portion that is slightly thicker than the lateral edges of the layer 81. This is because the calender rollers 40 are profiled slightly to provide a slight angle on each layer 81. As the tread 80 is being applied, the contour of the tread becomes more pronounced upon each layer 81 being formed.

The profile of the layers 81 permits a uniform flow of tread rubber in the curing mold 400. The profiling of the layers 81 may change based on the tread pattern being molded.

The hot former 450 includes a stock feed 452, an extruder 454 to process the rubber strips, a plurality of rollers 457 and a pair of calender rollers 456 to form continuous sheets or layers 81 of tread rubber. Once formed the sheets or layers are moved along a conveyor cooling belt 458 to be applied to the building drum 10 at the maximum temperature without prematurely initiating tread cure. This maximum tread temperature is about 160° F. which when placed in the mold shortens the cure cycle and wherein this continuous winding of hot layers 81 is accomplished to form the tread 80.

The hot former means 450, alternatively, may be substituted by a sheet laminator. Sheet laminators take extruded rubber and form sheets of rubber. Like the means 450 the sheet laminator can deliver the sheets or layers 81 to the building drum 10 while hot. The ability of building the tread belt 4 with hot components such as the tread layers 81 can greatly shorten the mold curing time.

With reference to FIG. 1, the means 100 is shown in position B with the tread belt assembly being shown as a dash line. When the means 100 is moved forward to position A, it is in direct axial alignment with the shaft 220 of the transfer means 200 as shown. As previously noted when the tread rubber 80 is completely applied to the tread building drum 10, the means 100 is in position A and is ready to have the tread belt 4 mounted on the building drum 10 transferred to the transfer means 200 once the assembly is completely assembled.

Figure 3A:
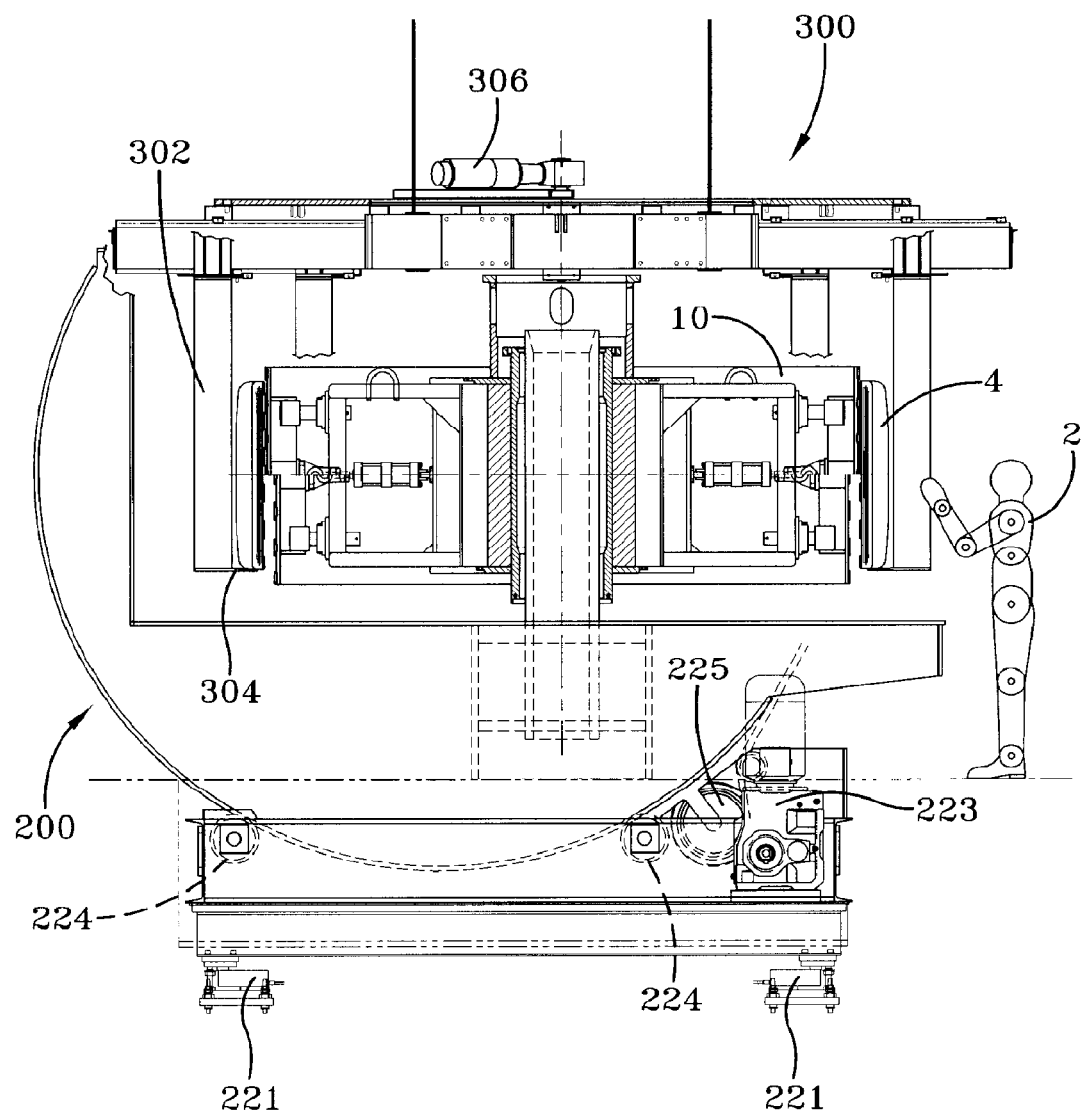
FIG. 3A is a plan view of the transfer device in the horizontal position and a tread belt overhead carrier mechanism.
Figure 3B:
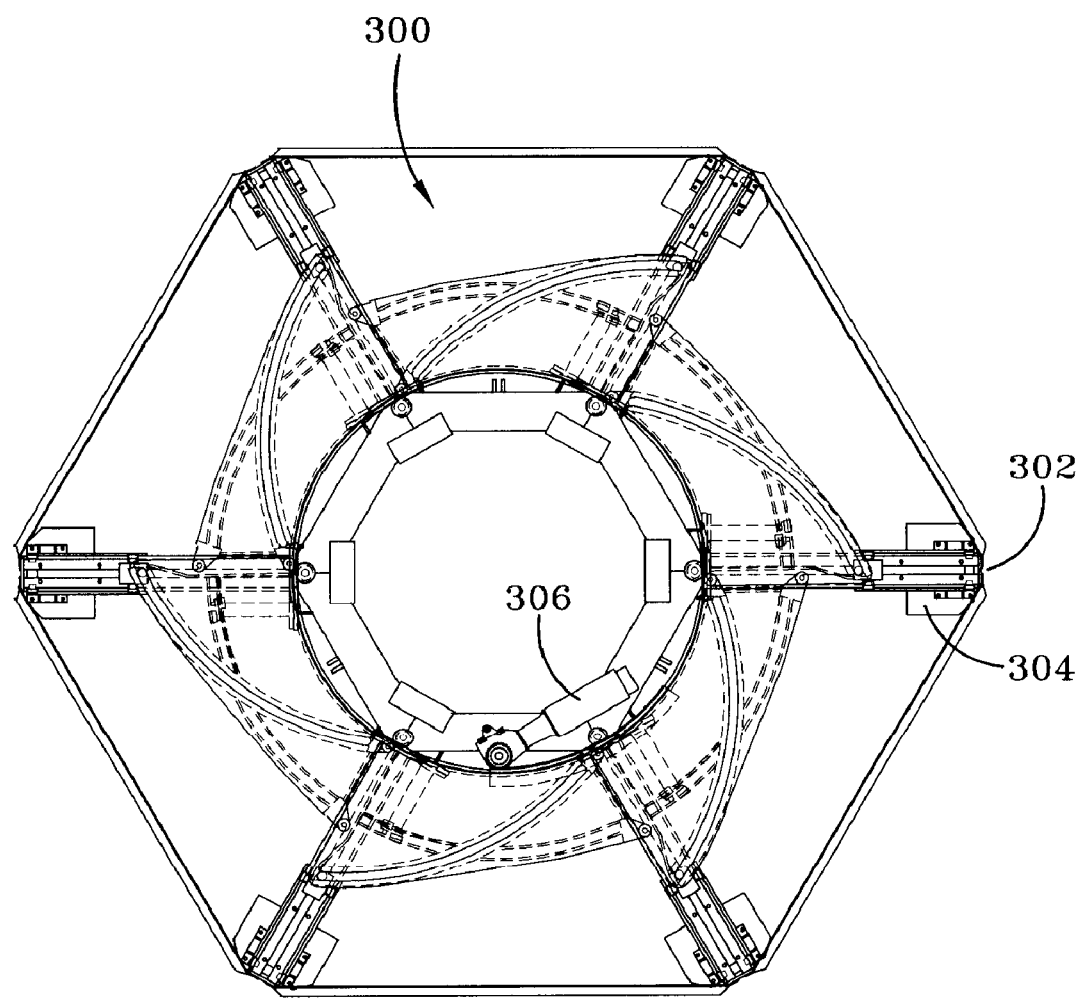
FIG. 3B is a top view of the tread belt overhead carrier mechanism.
Figure 4:
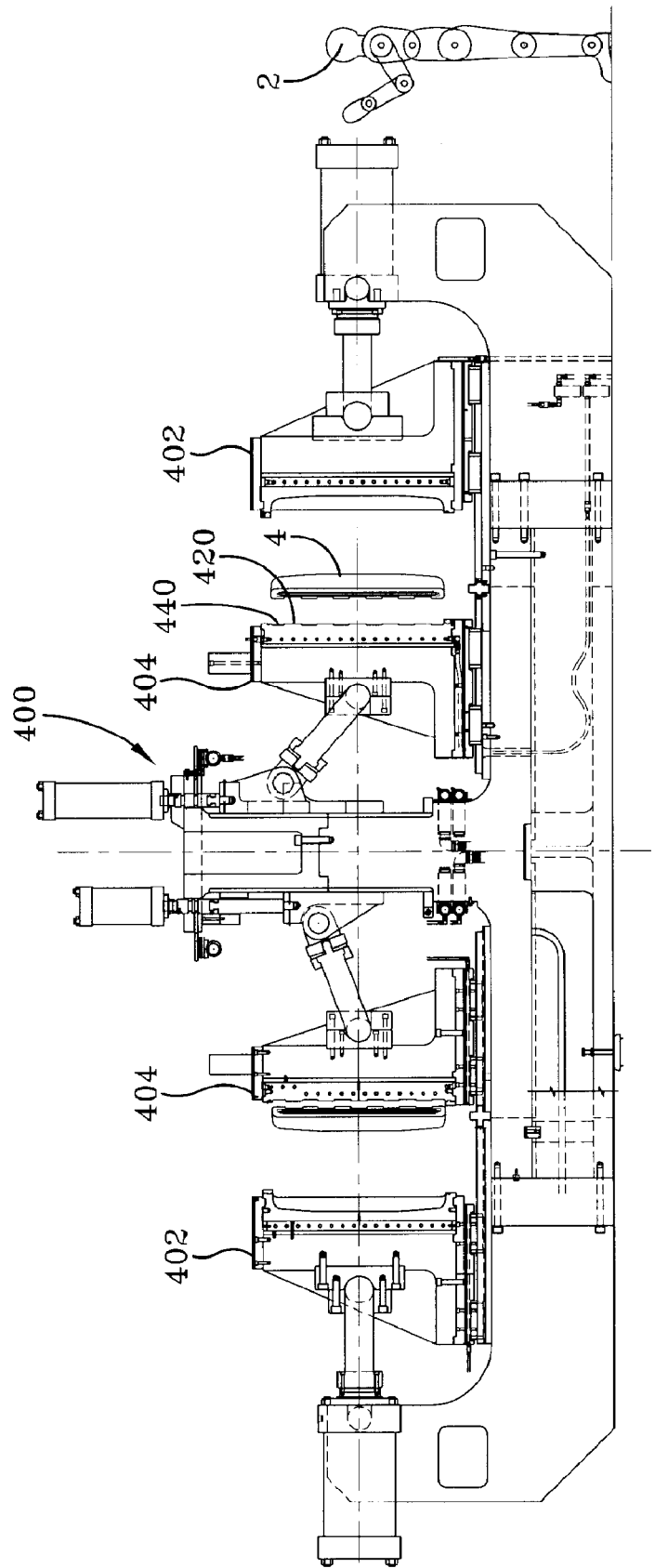
FIG. 4 is a view of a tread belt mold open to accept the tread belt.

A pusher means 280 is used to drive the tread drum assembly from the building shaft 120 and on to the transfer shaft 220. As shown in FIG. 2B the tread belt 4 has the lateral edges precisely located. In a preferred embodiment the building drum assembly 10 has the tread belt 4 lateral edges trimmed such that the lateral edge is pushed into contact with six spaced stops on the means 200 as the drum 10 is pushed fully onto the transfer shaft 220 to a mechanical stop on the transfer means 200. This insures the weight of the tread belt is supported on the lateral edges when the transfer means is pivoted horizontally. Once the pusher means 280 shoves the entire building drum assembly 10 onto the transfer shaft 220, the operator 2 can back up the building means 100, clearing the transfer means 200 and then pivotally rotating the transfer means 200 so that the tread belt 4 and building drum 10 are now laying in a horizontal position; that is, the axis of the transfer shaft 220 is facing in a vertical position and the tread belt circumference is lying in a horizontal plane as shown in FIG. 3A. A motor 223 is actuated driving a roller 225 which rolls the means over the rollers 224 as shown.

As further illustrated in FIG. 3A, an overhead pickup device 300 is illustrated. The overhead pickup device 300 as shown in 3A is positioned directly over the tread belt 4 and drum assembly 10 and is then lowered over the tread belt assembly 4. Vertically extending legs 302 with feet 304 are provided so that they can pick up the tread belt 4. In the fully expanded position legs 302 of the pickup device 300 are able to traverse over and encircle the tread belt 4. They are then rotated simultaneously inwardly by contracting the motor gearbox 306 such that the feet 304 on the legs 302 can grab a lateral edge of the tread belt 4 and pull it from the building drum 10. Prior to the pickup device 300 being able to remove the tread belt 4 from the building drum 10, the legs 302 of the pickup device 300 are raised applying a lifting force approximately equal to the tread belt weight. The transfer means 200 has load cells 221 in the base of the apparatus such that the operator can read a scale readout to determine when the exact amount of the lifting force is applied to the lateral edges or this can be computer controlled automatically. This effectively balances the tread belt 4 at a weight of zero on the building drum 10. This insures the internal ribs 72 will not be torn as tread belt 4 is removed. After the weight is balanced then the building drum 10 can be collapsed in a radially contracted position to free the tread belt 4 from the building drum 10.

Once the tread belt 4 has been picked up by the pickup device 300, the entire loaded mechanism is moved over a segmented mold cure station 400 that has been opened with the radially inner segment assemblies 404 retracted radially inward and the radially outer segment assemblies 402 expanded outwardly so that the assembly 4 can be lowered in between the inner segment assemblies 404 and outer segment assemblies 402 of the mold. Once the tread belt 4 is positioned several of the inner segment assemblies 404 can close about the inner circumference of the tread belt assembly such that the grooves 72 or ribs 74 are lined up with the grooves 420 or ribs 440 of the mold 400 and then several of the outer segment assemblies 402 partially close. Once this is accomplished, the pickup transfer device 300 is no longer required to support the tread belt 4 as the tread will be fully supported by the mold 400. The pickup transfer device 300 is then extracted from the mold 400 and the remaining inner and outer segment assemblies 404, 402 can close on the tread belt assembly 4 for the molding process.

Figure 5A:
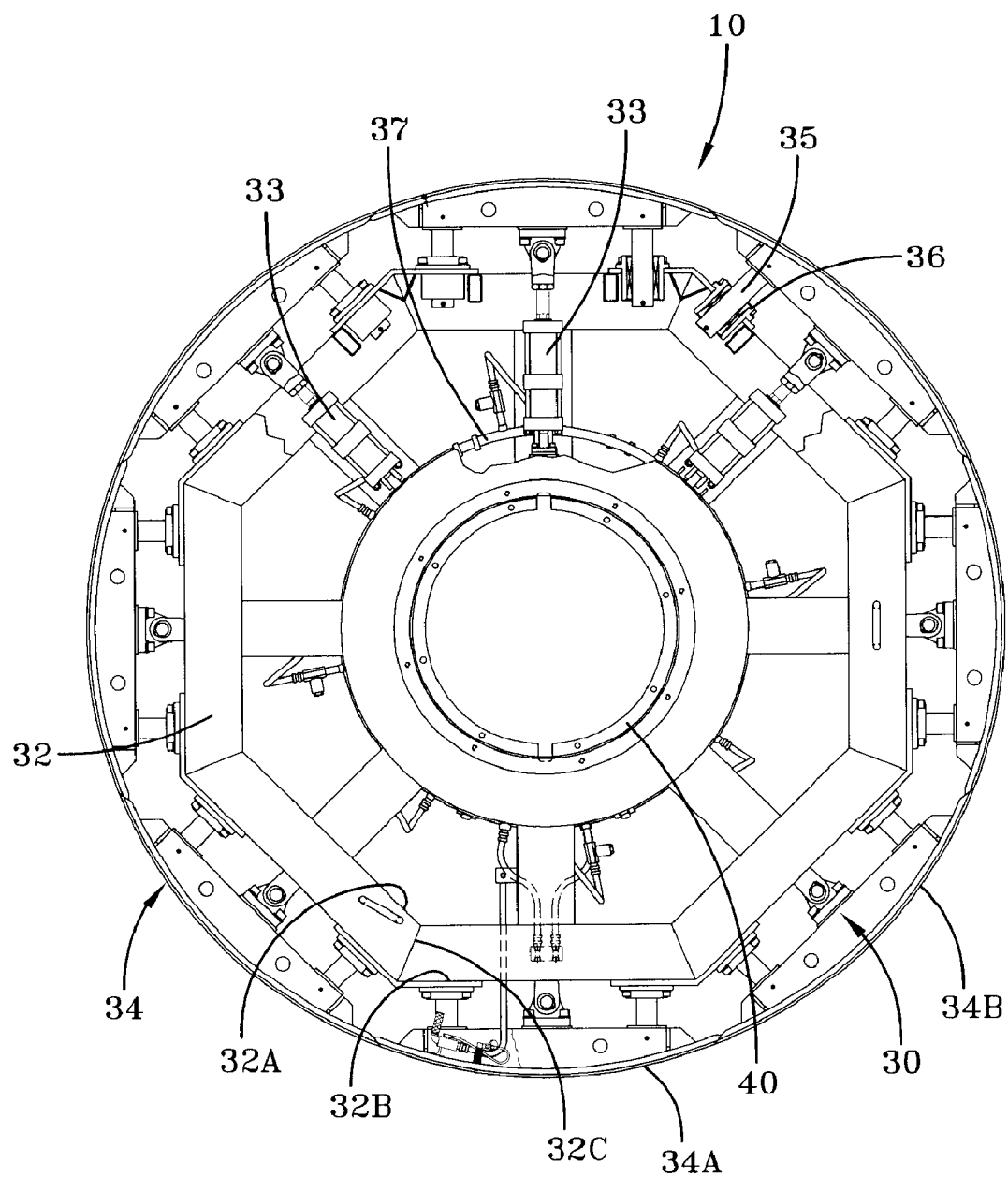
FIGS. 5A and 5B are top views of the building drum, 5A being in the radially expanding position and FIG. 5B being in the radially contracted position.
Figure 5B:
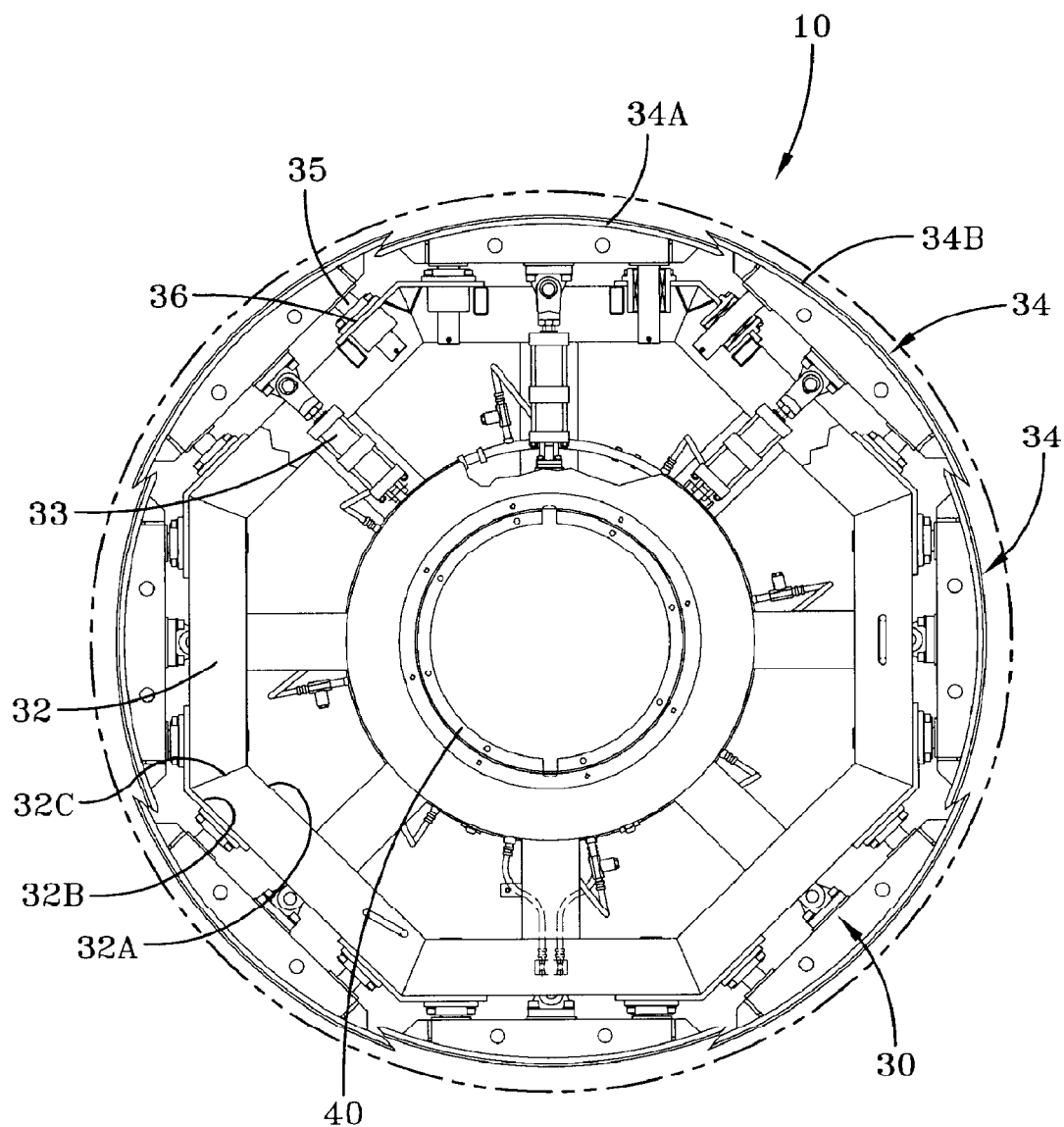

With reference to FIGS. 5A and 5B the view looking into the building drum 10 towards the axis of rotation is illustrated. In FIG. 5A, the building drum 10 is shown in the fully radially expanded position. In FIG. 5B the building drum 10 is shown in a radially collapsed position, the dash lines showing the radially expanded position. The tread belt building surface 120 of the building drum 10 is formed by a plurality of arcuate segment assemblies 30. Each segment assembly 30 is radially contractible. Each segment assembly 30 is connected to a mechanically locking air or hydraulic cylinder 33 internally positioned between the arcuate segment 34A, 34B and the central hub 40. These mechanical locking cylinders 33 once extended are mechanically locked in the extended position until re-energized. Each segment assembly 30 includes a trapezoidal support 32 and arcuate building surface segments 34. Each trapezoidal support 32 has a radially inner portion 32A narrow and the sides 32C of all adjacent trapezoids are in full contact to form an octagonal 360° rigid frame when the building drum 10 is either in the fully extended or fully retracted position. The arcuate building surface 34 has a plurality of segments that are alternating arcuate segments 34A having the inner portion narrow and the outer portion wider and arcuate segments 34B the inner portion wider and the outer portion narrow in each adjacent pair creating an alternating pattern that permits the outer surface 34 to form a complete peripheral surface for building the tread belt assembly 4 in a fully supported manner and which also permits each arcuate segment 34A, 34B to be retracted in an alternating pattern for tread belt removal. For example, there are eight quadrants as shown. Four arcuate segments 34A will have the outer portion wider and inner portion narrower and four arcuate segments 34B will have the outer portion narrower and the inner portion wider so that the arcuate segments 34A, 34B can be retracted in a sequence and expanded in a sequence to form the building surface 34 and to permit a contraction so that the tread belt 4 can be released in a convenient and efficient manner.

Each arcuate segment assembly 30 has four shafts 35 and bearings 36 connected to the trapezoidal support 32. These bearings 36 and shafts 35 permit slidable movement of the arcuate segment 34 when the cylinder 32 is actuated. Each cylinder 33 is connected to a central manifold 37. Air is provided in a fashion to direct an expansion or contraction of the arcuate segment 30 as a function of the cylinder 33 being actuated. As noted, these features permit the tread belt assembly 4 to be formed on a fully supported arcuate circular building drum 10 which can be easily retracted permitting the removal of the tread belt assembly when placed in the transfer device 200.

Figure 6A:
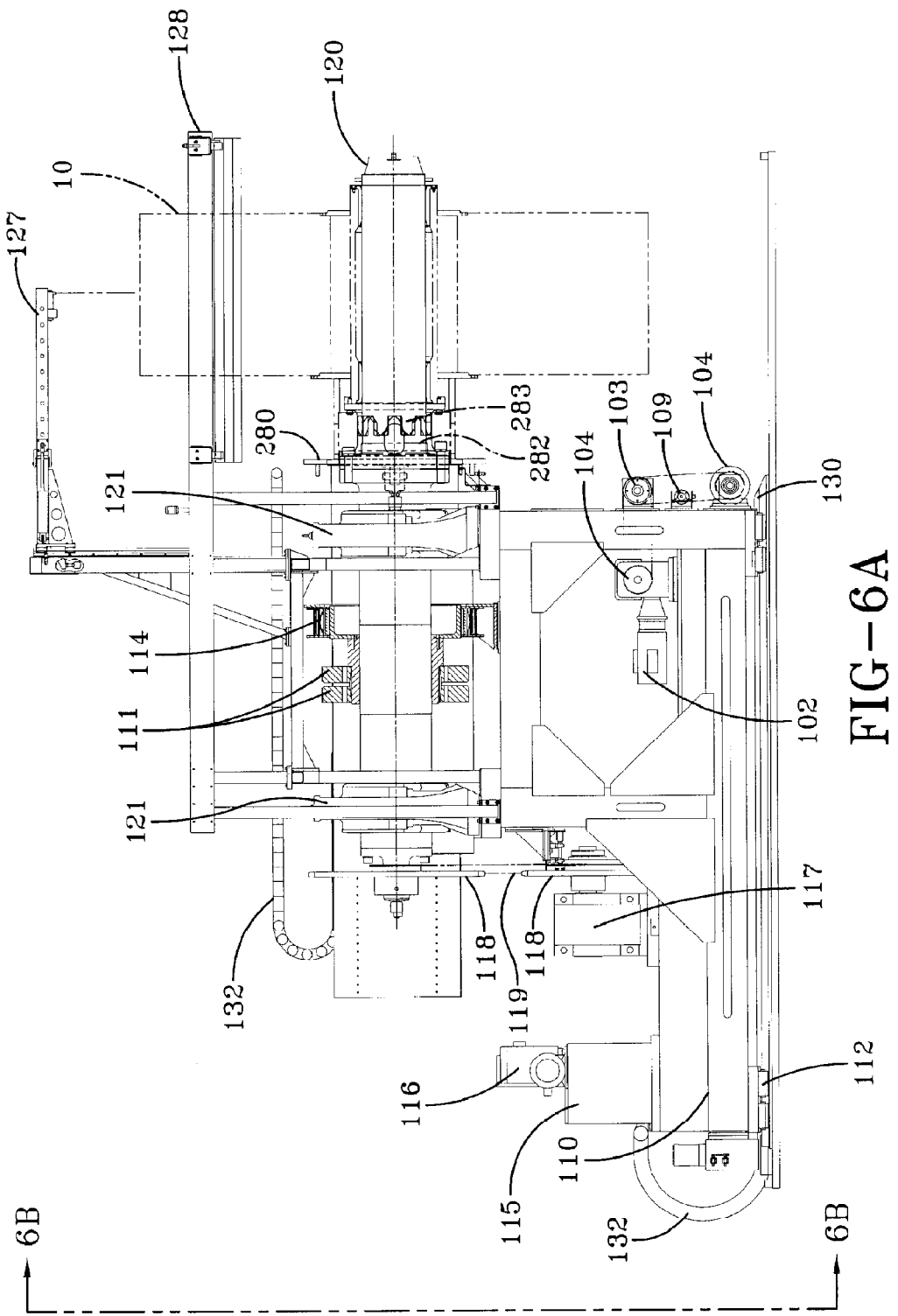
FIG. 6A is a plan view of the tread belt building drum apparatus.
Figure 6B:
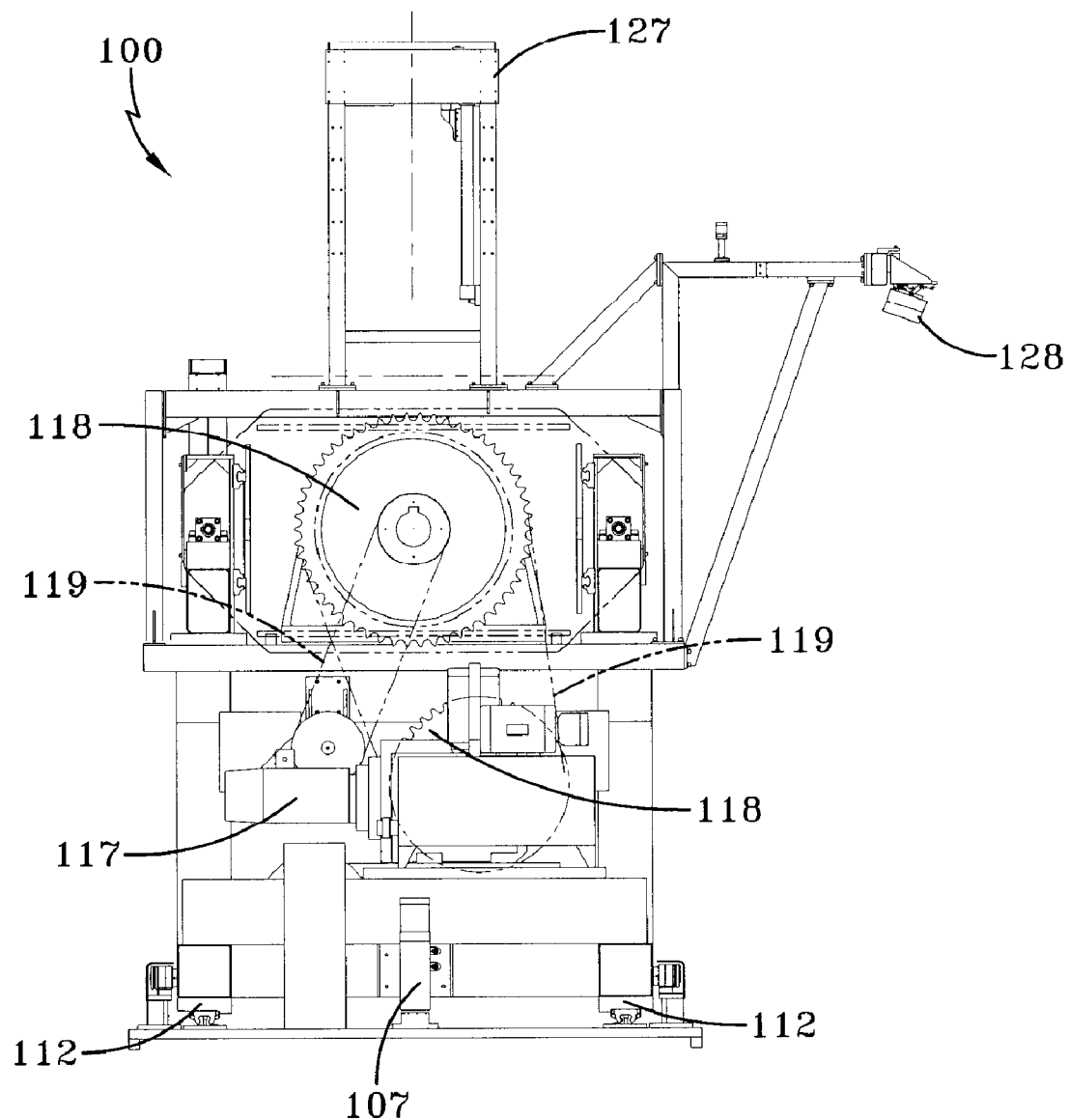
FIG. 6B is an end of the tread belt building drum apparatus.
Figure 7:
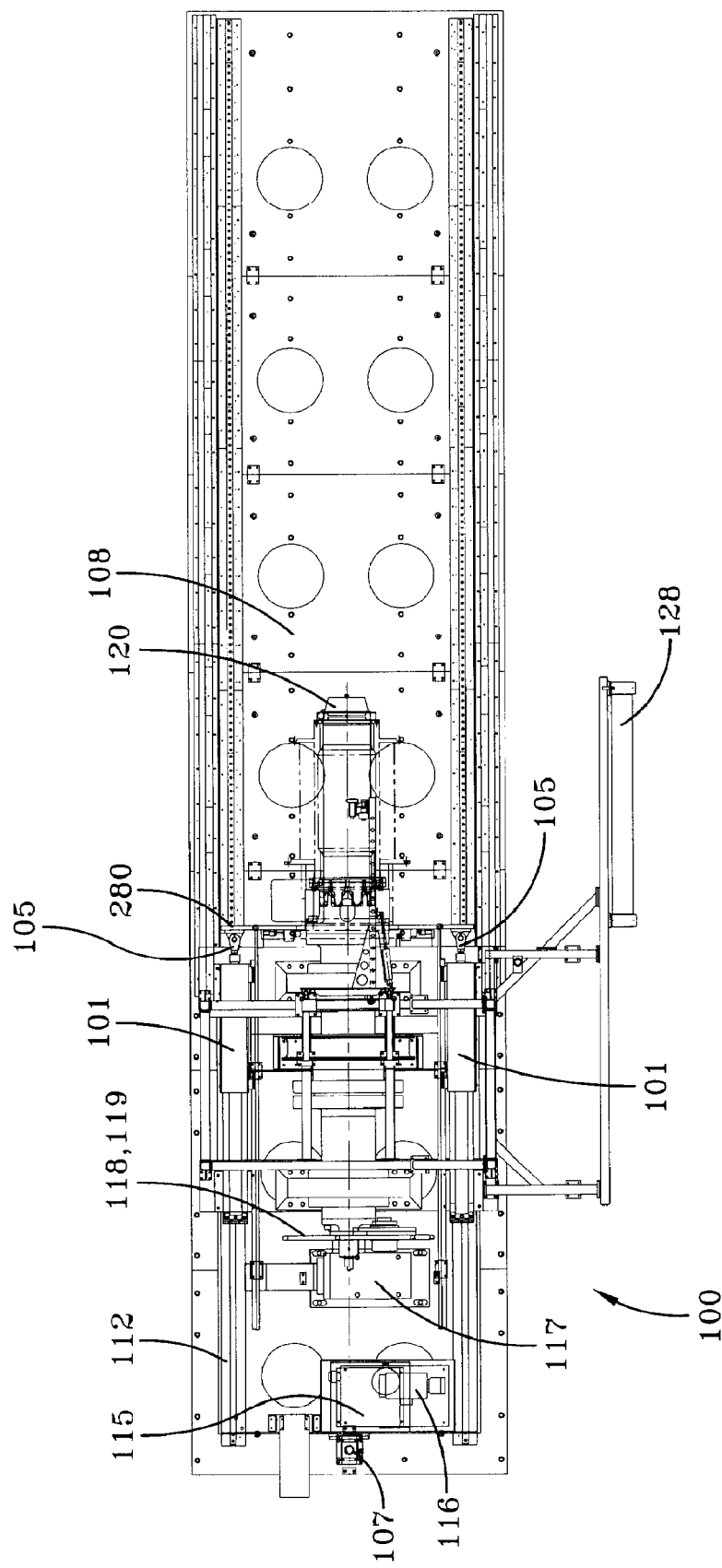
FIG. 7 is a top view of the tread belt building drum apparatus.

With reference to FIGS. 6A, 6B and 7, the means 100 for forming the tread belt assembly 4 is shown in an enlarged view. As shown, the means 100 for forming is mounted on a rail system 130 that permits slidable movement of the entire assembly 100 so that the tread belt components can be applied in either position A or position B as previously noted. Attached to the frame 110 are linear bearings 112 that permit easy and simple slidable movement of the entire mechanism 100. All of the electronics and wiring are provided on a flexible cable 132 as illustrated above such that the entire wiring harness 132 can be moved and permit movement from position A to position B and back without impeding the ability of the equipment to function.

The means 100 as shown in FIGS. 6A, 6B and 7 has a means 127 for measuring the rotational surface speed of the components applied to the building drum 10. The speed of the surface of the components on the building drum at a given diameter is fed back to the means 360 for applying the encapsulated wires 92 to insure the layer 90 of wires 92 is applied at the same speed as the drum winds. Similarly, speed of calendering the sheets or layers 81 of tread rubber is tied to the surface speed of the drum 10 so that as the diameter of the layers increases just the right amount of rubber is fed to the drum as it rotates. A non-contacting speed sensor 127 feeds the speed back to control computers to keep each machine in synchronization. The centerline laser light 128 provides an indication of the edge straightness of the layers as they are applied. Precise edge control insures all the layers are properly applied.

Movement of the means 100 from position A to position B is directed by empowering a small motor 102 as illustrated connected to a slip clutch 103 and gears 104 that provide movement of the assembly relative to the rails 130. The movement of the entire means 100 is precisely controlled and an encoder device 109 is provided to know the actual position and relative movement of the building drum 10 such that it can be properly centered and positioned from movements from A to B in a very precise manner. A tapered drive pin 107 presses into the floor assembly 108 when the means 100 is in its proper position either in A or B and is retracted to enable the equipment to move. Although the equipment weighs several tons, the movement on the linear bearing 112 is basically very low friction and can be easily moved by pushing the means 100 as so desired. A pair of locking assemblies 109, such as those formally referred to as Ringfeder®, are shown mounted to the shaft 120 and connected to the locking assemblies 109 is an air brake 114. This provides for rapid and quick stopping of the rotation of the building drum 10.

Figure 8:
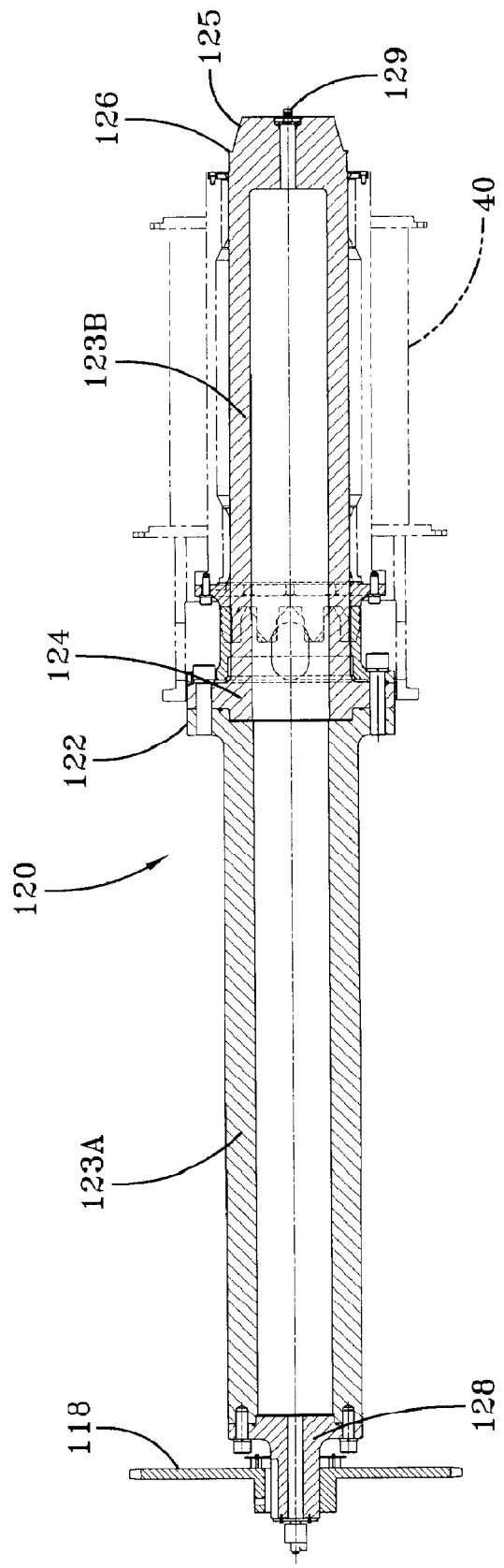
FIG. 8 is a cross-sectional view of the building drum shaft.

On the lower left hand side of the means as illustrated in FIG. 6A is a hydraulic reservoir 115 and pump 116. Next to the hydraulic reservoir 115 and pump 116 and mounted to the frame 110 is a 20 horsepower motor 117. The 20 horsepower motor 117 is connected to the shaft gears 118 by a chain 119. The entire shaft 120 is chain driven. The shaft 120 is supported by two large split free bearings 121. At the cantilevered end of the shaft 120 is an enlarged pusher plate 280. Attached to the pusher plate 280 is a dog drive 282 and interconnected to the building drum 10 is a mating dog drive assembly 283. These dog drives 282, 283 intermesh and provide a driving means for the building drum 10. Two cylinders 101 on each side of the means 100 provide for movement against the pusher plate 280 to push the entire building drum assembly 10 onto the transfer means 200. Each cylinder 101 is connected using a self-aligning coupling 105 to prevent the mechanism from binding under load differentials. With reference to FIG. 8, it can be seen that the shaft 120 is comprised of hollow tubular cylinders 123A, 123B with flanges 122, 124 at the midpoint. These flanges 122, 124 provide a connection from the internally supported shaft cylinder 123A and the externally cantilevered cylinder 123 and phantom lines show the hub 40 of the building drum assembly 10 as shown. The radially outer end of the shaft is tapered with a mechanical stop. At the very extreme end of the tapered cantilevered end of the shaft 120 is an air fitting 129 that is provided just to facilitate the operator 2 and in case he needs an airline connected he can connect at the shaft distal end fitting 129. At the opposite end of the shaft 120 the drive gear 118 is shown attached to the gear sprocket end 128 which enables rotational movement to be transmitted to the shaft.

Figure 9:
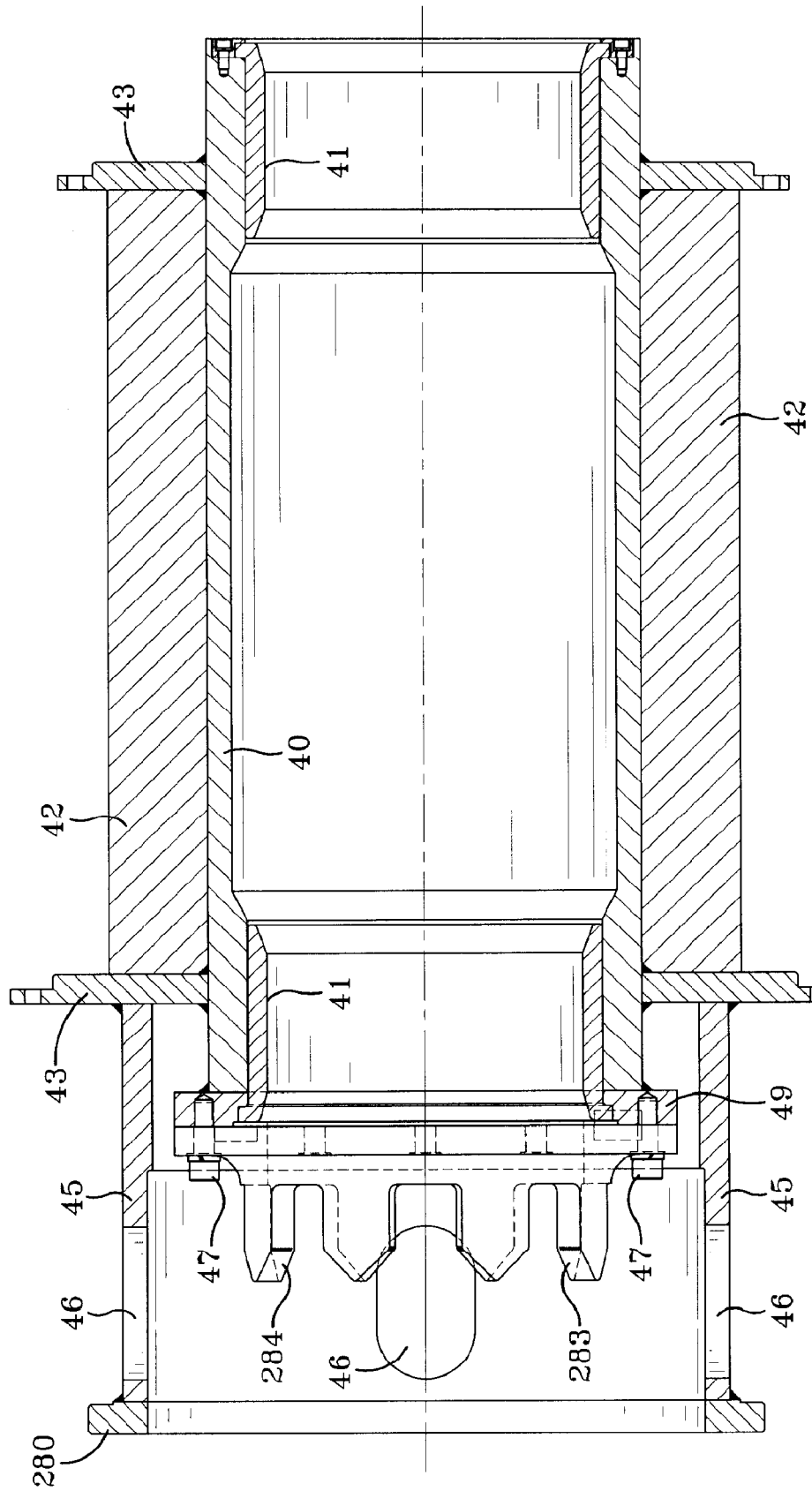
FIG. 9 is a cross-sectional view of the building drum hub and drive dog assembly.
Figure 10:
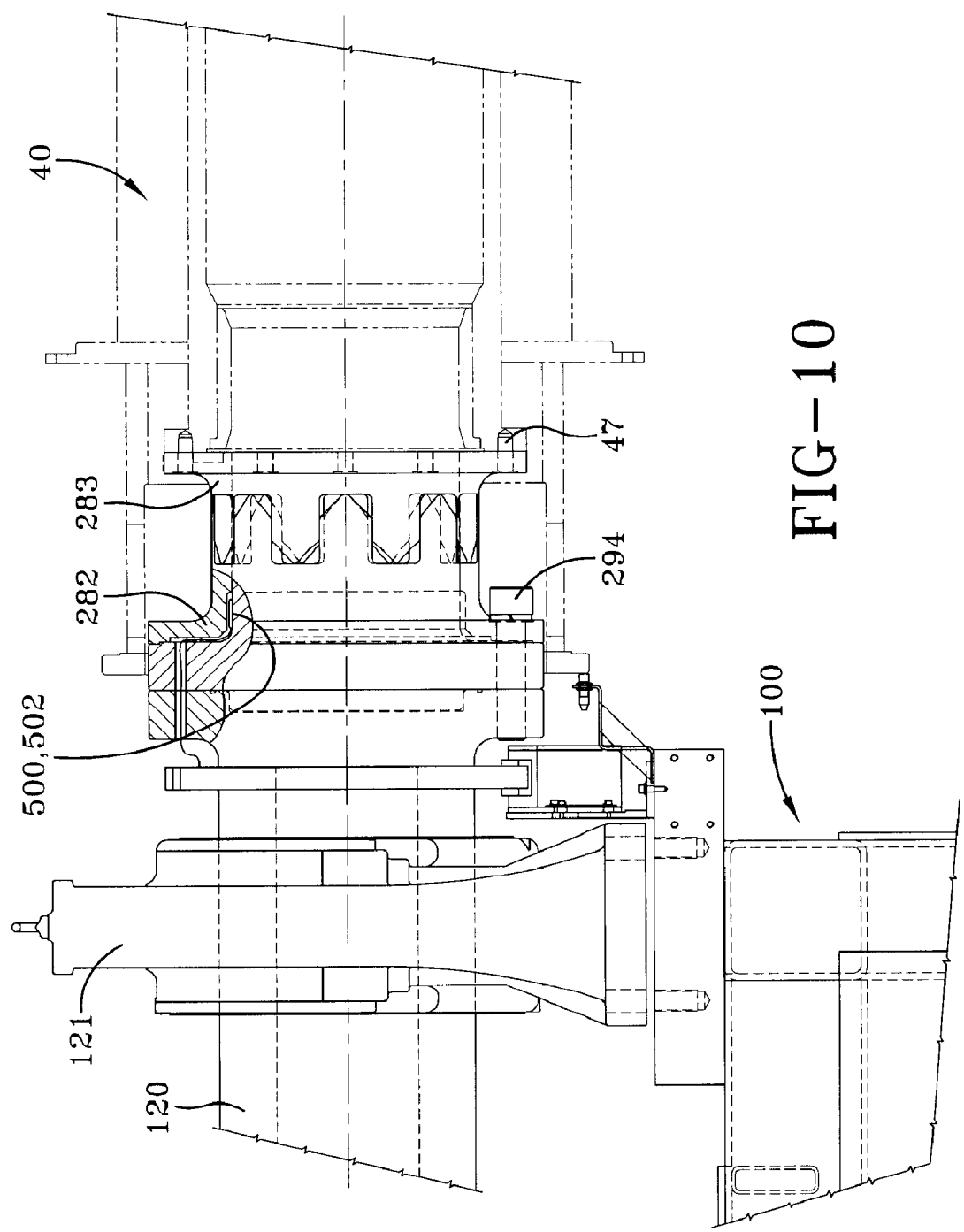
FIG. 10 is a view of the shaft drive dog intermeshed with the drum drive dog and further illustrating the weighing means.
Figure 12:
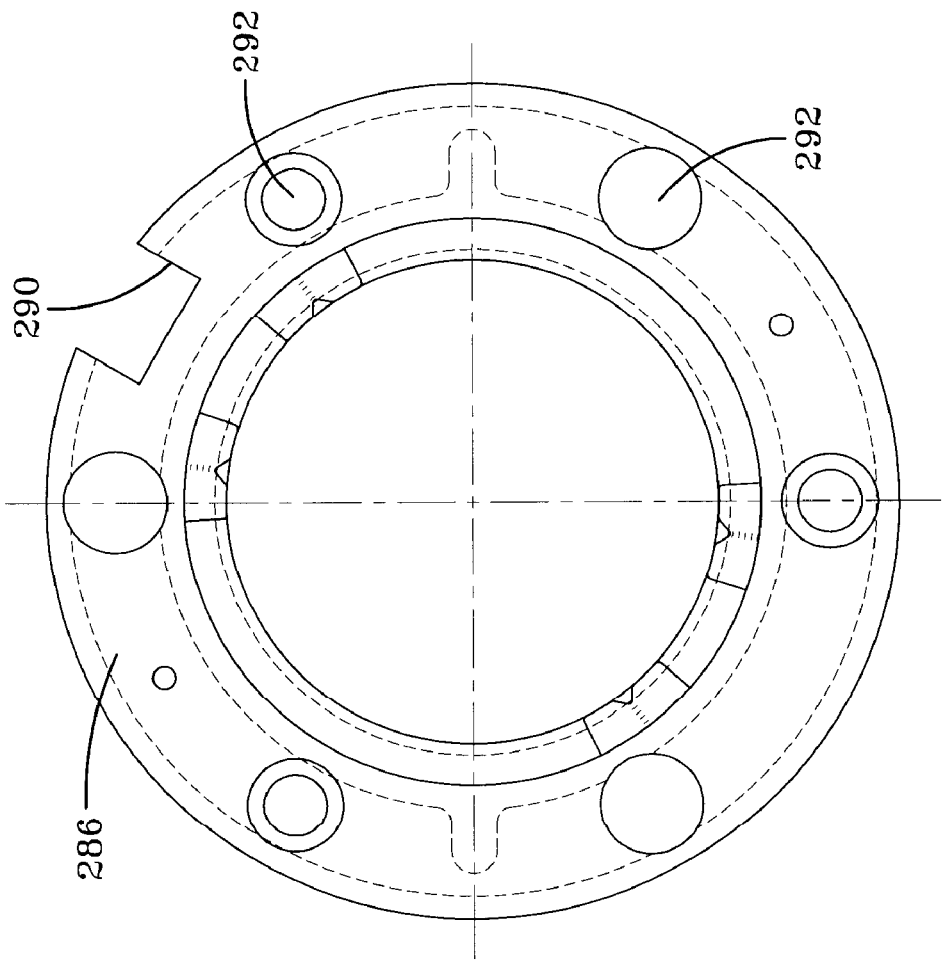
FIG. 12 is a plan view of the drive dog of FIG. 11.
Figure 11:
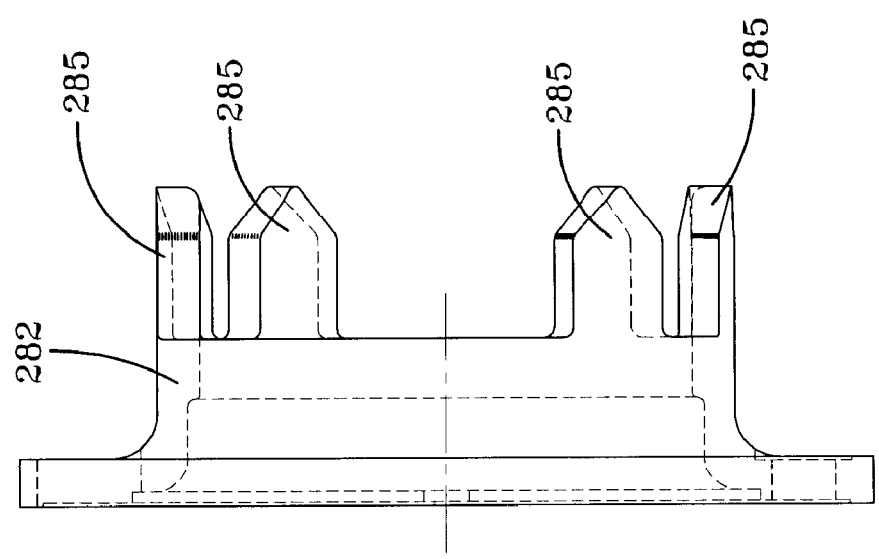
FIG. 11 is a side view of the drive dog for shaft assembly.
Figure 13:
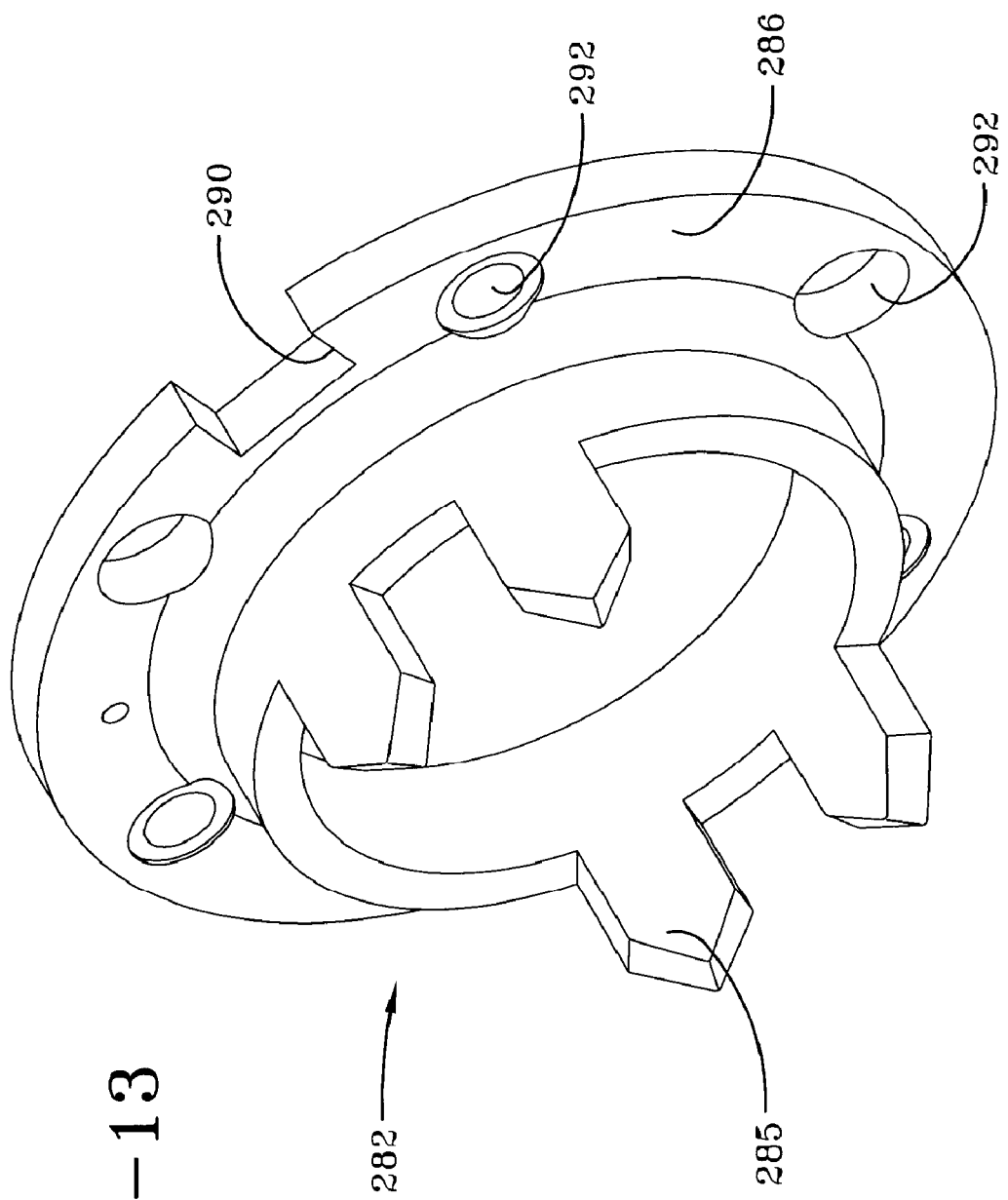
FIG. 13 is a perspective view of the drive dog of FIGS. 11 and 12.

With reference to FIG. 9, the hub 40 of the building drum 10 is illustrated. As shown there are a pair of naval bronze bearings 41 that are used to fit directly onto the cantilevered portion of the shaft 120. Each bearing 41 has a tapered end and provides slidable movement on the shaft 120 so that the entire building drum assembly 10 can be moved back and forth. The hub 40 shows gussets 42 provided for additional support and strengthening of the hub assembly 40. The gussets 42 are positioned between the two annular plates 43 of the hub assembly as illustrated. An outer sleeve 45 is provided with a hole 46 in several locations so that access can be provided to the shaft 120 once the building drum 10 is mounted on the shaft 120 should there be a need to do repair work on the shaft 120 while the building drum 10 is mounted on it. As shown in the center portion of the hub 40 the dog drive 283 is bolted with bolts 47 directly to an end plate 49 on the hub assembly. This dog drive 283 provides drum rotational movement. There are approximately eight tapered teeth 284 that intermesh with the dog drive shaft assembly 282. At the far left-hand side of the building drum hub as shown in FIG. 9 is the pusher plate 280. With reference to FIGS. 11, 12 and 13, the dog drive 282 that is mounted to the main shaft or drive shaft 120 of the means 100 is illustrated. The dog drive 282 only has two teeth 285 at each location 0° and 180°. It has been found by using pairs of teeth 285 diametrically opposed relative to the shaft 120 that very precise measurements can be made of the strain on the cantilevered shaft 120 as the tread belt 4 is being assembled. A key slot 290 is shown such that the dog drive 282 can be precisely mounted. The key slot is shown on the annular flange 286 of the dog drive 282. Holes 292 are provided for attaching the dog drive 282 to the shaft 120. Threaded fasteners 294 are used for the purpose of securing the dog drive 282 to the shaft 120. By using adjacent pairs of teeth 285 as illustrated that are diametrically opposed, a precise and always known drive location can be found on the shaft. All loads and moments placed on the shaft 120 are then controlled by diametrically opposed pairs of teeth 285. It was found during the testing of the means 100 that a means 500 for weight measuring the tread belt 4 as it is being formed can be provided. The means 500 for measuring consisted of strain gauges 502 positioned between the drive dog 282 mounted on the shaft 120 and the shaft 120. These strain gauges 502 measure the strain of the shaft 120 and can translate that to a weight. It was determined that by having the weight transmitted through diametrically opposed teeth 285 that no binding or misreading of weight can occur. In other words, all weight transfer occurs through the teeth 285 directly above and below the teeth 285, thereby positioning the strain gauge 502 between these teeth 285 would provide a very accurate way of measuring the weight of the tread belt assembly 4 as it is being formed. Measurements are taken as the tread belt 4 is applying the various components. The means 500 for measuring when connected to a computer with software designed to indicate to the operator that he has in fact applied the necessary components in the necessary amount as the belt 4 is being formed means that each application of components would have a specific weight and that weight would be fed into the computer, and as the tread belt is being built the accumulated weight of each component as it is added can be measured and compared to the specification. An additional feature that has been beneficial to the manufacturer of the tread belt 4 is that if a layering of tread rubber 80 is found to be either deficient in the amount of material or is being applied at too rapid a rate, it is possible for the operator to adjust the number of windings so that the rotation of the drum 10 can be stopped either on a fraction or a multiple of additional rotations to ensure that the proper tread belt weight is formed when the tread belt 4 is being assembled. This is particularly useful when one is building a tread belt 4 using relatively thin layers 81 of tread rubber 80. As illustrated, the tread 80 is wound in layers 81 approximately 0.080 inch at the center and 0.55 inches at the tread edges to a total thickness of approximately four inches at the center. This means that if the tread rubber 80 being applied is slightly light or slightly heavy the operator can simply stop the rotation at the precise weight required. It has been determined that in the manufacture of tires, for example, calendered material that is used in making treads can vary by as much two to four percent. If this occurs, the weight of the tread being applied to the tire can be off by a few pounds. This has both an economic impact and a uniformity concern. With a tread belt that weighs approximately 4,000 pounds, a 2% deviation in weight can be in error as much as 80 pounds.

The inventors have found that the variations in specific gravity of the rubber layers can influence the volume of the tread belt. The application of the tread rubber can be adjusted by knowing the specific gravity of the tread rubber prior to calandering of the sheet or layers 81. Accordingly, the amount of rubber to be used on a given tread belt 4 can be varied based on the specific gravity of the tread rubber. Throughout the present description the weighing of the tread belt 4 has been described. By knowing the specific gravity of the rubber the required weight can be calculated and the computer controlled equipment can apply the precise amount of material within a few pounds. The mold 400 having rigid external and internal segments means the curing volume is fundamentally fixed. Accordingly, if the volume of the tread belt 4 varies by a large amount the mold either will not close properly or the tread will not be fully developed. Therefore, it is imperative in the manufacture of such large tread belts, as used in the two-piece tires as manufactured in this application, that the precision of the material applied to the tread belt must be extremely precise such that errors of no more than a few pounds occur during the manufacture. The present apparatus provides a system which enables the manufacture of tread belts to be done in a very precise manner without significant variation in tread weight.

What is claimed is:

1. The method of building and transferring a tread belt structure on a portable and collapsible building drum mounted carefully on a building machine with a rotatable shaft; comprises the steps of forming the annular tread belt on the building drum;

transferring the building drum with tread belt from the rotatable shaft onto a pivoting transfer device;

pivoting the transfer device about 90° rendering the tread belt and building drum's axis perpendicular to a horizontal plane;

collapsing the building drum;

separating the annular tread belt from the building drum and removing the tread belt while the building drum is on the transfer device;

expanding the building drum;

pivoting the building drum into co-axial alignment with the rotatable shaft;

moving the building drum onto the shaft.

2. The method of claim 1 wherein the steps of forming the annular tread belt includes the steps of:

applying at least one first tread rubber layer as a plurality of first tread strips onto the rotating building drum;

applying one or more cord reinforced layers over the at least one first tread rubber layer while rotating the building drum; and winding one or more layers of tread rubber onto the underlying cord and rubber layers to form the tread belt structure.

3. The method of claim 2 further comprises the step of weighing the building drum as the tread belt is being formed annularly.

4. The method of claim 3 further comprises adjusting the amount of elastomeric material to be applied to form the tread belt to match the weight or volume at a known specific gravity of the elastomeric material to a predetermined specification weight or volume.

5. The method of claim 4 further comprises the step of forming the elastomeric layers by calendering or extruding layers or strips of unvulcanized rubber at the tread building machine and applying the layers or strips while hot onto the building drum.

6. The method of claim 5 further comprises the step of controlling the elastomeric gauge of the material as a function of monitored weight at the building drum.

* * * * *